United States Patent
McNish et al.

(10) Patent No.: US 11,958,629 B2
(45) Date of Patent: Apr. 16, 2024

(54) ELEVATED STATION FOR UNMANNED AERIAL VEHICLES

(71) Applicant: ZIPLINE INTERNATIONAL INC., South San Francisco, CA (US)

(72) Inventors: Tyler P. McNish, Woodside, CA (US); Stefan C. Aprodu, San Francisco, CA (US); Keenan A. Wyrobek, Half Moon Bay, CA (US); William Hetzler, San Mateo, CA (US); Bijal Mehta, San Francisco, CA (US); Ryan Alam, Brooklyn, NY (US)

(73) Assignee: Zipline International Inc., South San Francisco, CA (US)

( * ) Notice: Subject to any disclaimer, the term of this patent is extended or adjusted under 35 U.S.C. 154(b) by 0 days.

(21) Appl. No.: 17/388,963

(22) Filed: Jul. 29, 2021

(65) Prior Publication Data

US 2022/0033074 A1  Feb. 3, 2022

Related U.S. Application Data

(60) Provisional application No. 63/059,513, filed on Jul. 31, 2020.

(51) Int. Cl.
*B64F 1/222* (2024.01)
*B64C 39/02* (2023.01)
(Continued)

(52) U.S. Cl.
CPC ............ *B64F 1/222* (2013.01); *B64C 39/024* (2013.01); *B64F 1/029* (2020.01); *B64F 1/04* (2013.01);
(Continued)

(58) Field of Classification Search
CPC .. B64F 1/222; B64F 1/029; B64F 1/06; B64F 1/22; B64C 2201/084; B64C 2201/182; B64U 70/70
See application file for complete search history.

(56) References Cited

U.S. PATENT DOCUMENTS 9,718,564 B1 * 8/2017 Beckman ................ B61L 23/00
11,156,010 B1 * 10/2021 Corban .................. E04H 1/1205
(Continued)

FOREIGN PATENT DOCUMENTS

CN   109649671 A * 4/2019 ............... B64F 1/00
EP   3680181 A1 * 7/2020

OTHER PUBLICATIONS

U.S. Department of Transportation Federal Highway Administration Freight Management and Operations, Federal Size Regulations for Commercial Motor Vehicles, Oct. 9, 2019, USDOT Federal Highway Administration, p. 1, https://ops.fhwa.dot.gov/freight/publications/size_regs_final_rpt/ (Year: 2019).*

*Primary Examiner* — Nicholas McFall
*Assistant Examiner* — Terri L Filosi
(74) *Attorney, Agent, or Firm* — Dorsey & Whitney LLP

(57) ABSTRACT

Described herein is an elevated unmanned aerial vehicle (UAV) station. The elevated UAV station includes an elevated platform and a conveyance device configured to raise a payload to the elevated platform. The elevated unmanned UAV station may further include a launch device configured to cause a takeoff of a UAV from the elevated platform. The elevated UAV station may further include a recovery device configured to cause a controlled landing of the UAV at the elevated platform. The elevated UAV station may be associated with a payload housing structure to establish a system for payload storage and launch.

26 Claims, 13 Drawing Sheets

(51) Int. Cl.
*B64F 1/02* (2006.01)
*B64F 1/04* (2006.01)
*B64F 1/06* (2006.01)
*B64F 1/32* (2006.01)
*B64U 10/25* (2023.01)
*B64U 30/10* (2023.01)
*B64U 50/19* (2023.01)
*B64U 70/00* (2023.01)
*B64U 70/30* (2023.01)
*B64U 80/00* (2023.01)
*B64U 101/60* (2023.01)

(52) U.S. Cl.
CPC .................. *B64F 1/06* (2013.01); *B64F 1/32* (2013.01); *B64U 10/25* (2023.01); *B64U 30/10* (2023.01); *B64U 50/19* (2023.01); *B64U 70/00* (2023.01); *B64U 70/30* (2023.01); *B64U 80/00* (2023.01); *B64U 2101/60* (2023.01)

(56) References Cited

U.S. PATENT DOCUMENTS

2017/0175413 A1* 6/2017 Curlander ................. B64F 1/32
2017/0316699 A1* 11/2017 Gil ....................... G08G 5/0069
2021/0197983 A1* 7/2021 Wang ..................... B60L 53/60

* cited by examiner

ELEVATED STATION FOR UNMANNED AERIAL VEHICLES

CROSS-REFERENCE TO RELATED APPLICATIONS

This application claims priority to U.S. Provisional Patent Application No. 63/059,513, filed Jul. 31, 2020, entitled "ELEVATED STATION FOR UNMANNED AERIAL VEHICLES," which is incorporated by reference herein, in the entirety and for all purposes.

FIELD

The described embodiments relate generally to unmanned aerial vehicles (UAVs), and more particularly, to launch and landing systems for UAVs.

BACKGROUND

Unmanned aerial vehicles (UAVs) may be used to efficiently deliver products to consumers. In some systems, a facility having a substantial footprint may be required in order to facilitate takeoff and/or landing of the UAV. Local regulations may also require a setback around the facility so that the UAV is ensured a clear flight path, especially during accent and approach. The size, setback, and other considerations, including noise, has limited the applicability of conventional UAV support facilities. Accordingly, operators of UAVs may find it difficult to utilize UAVs in conjunction with existing infrastructures, such as the infrastructure provided by preexisting points-of-sale for consumer and direct-to-business goods.

SUMMARY

In a first example, an elevated unmanned aerial vehicle (UAV) station is disclosed. The elevated UAV station includes an elevated platform. The elevated UAV station further includes a conveyance device configured to raise a payload to the elevated platform. The elevated UAV station further includes a launch area configured to allow takeoff of a UAV from the elevated platform.

In another example, the station may further include a recovery device configured to cause a controlled landing of the UAV at the elevated platform. The launch area may further include a launch device configured to cause the takeoff of the UAV from the elevated platform. The elevated platform may be configured for arrangement adjacent a payload housing structure. For example, the payload housing structure may be adapted to store the payload at a storage elevation below a platform elevation of the elevated platform. The payload housing structure may include one or more of a retail location, a wholesale location, a distribution location, or a community co-op location.

In another example, the platform elevation may define an above-grade clearance of at least 14 feet. The conveyance device may extend from at least the storage elevation to the platform elevation.

In another example, the conveyance device may include one or more of a dumbwaiter, a belt conveyor, and/or a pneumatic conveyor. In some cases, the conveyance device may be a first conveyance device. In this regard, the elevated UAV station may further include a second conveyance device arranged with the elevated platform to route the payload from the first conveyance device to the UAV.

In another example, the station may further include a logistics zone arranged with the elevated platform. The logistics zone may include a fixed-wing storage having a plurality of fixed-wing assemblies. The logistics zone may further include a battery storage having a plurality of battery assemblies and a corresponding plurality of docking stations. The logistics zone may further include a fuselage storage having a plurality of fuselages.

In another example, the UAV may include a fixed-wing assembly from the plurality of fixed-wing assemblies. The UAV may further include a battery assembly from the plurality of battery assemblies. The UAV may further include a fuselage from the plurality fuselages. The fuselage may be adapted to receive the payload and store the payload during a flight of the UAV. The elevated UAV station may include the UAV.

In another example, the launch device may include a track and a pulley system. The track may be adapted to receive the UAV. The pulley system may be configured to engage the UAV and accelerate the UAV along the track. These and associated operations may cause the takeoff of the UAV from the elevated platform.

In another example, the elevated UAV station may further include a recovery device. The recovery device may include a pair of arms, a wire extending between the arms, and an actuator configured to manipulate the pair of arms between a first position and a second position. When the arms are in the second position, the wire may be arranged within a flight path of the UAV. The UAV may include a hook configured to engage the wire. These and associate operations may cause the controlled landing of the UAV at the elevated platform. The launch device may be one of a plurality of launch devices, each of the plurality of launch devices configured to cause the takeoff of the UAV from the elevated platform.

In another example, a system is disclosed. The system includes a payload housing structure adapted to store a pluralities of payloads. The system further includes an elevated unmanned aerial vehicle (UAV) station associated with the payload housing structure. The elevated UAV station is adapted to receive a payload of the plurality of payloads and transport the payload to an offsite location using a UAV.

In another example, the elevated UAV station may include a conveyance device configured to raise the payload to an elevated platform. The elevated UAV station may further include a logistics zone. The logistics zone may include modular components used to assemble the UAV.

The modular components may include a plurality of fixed-wing assemblies, a plurality of battery assemblies, and a plurality fuselages. In some cases, the example system may further include the UAV. The UAV may include an assembly of one of any fixed-wing assembly of the plurality of fixed-wing assemblies described herein, any battery assembly of the plurality of battery assemblies described herein, and any fuselage of the plurality of fuselages described herein.

In another example, the payload housing structure may include one or more of a retail location, a wholesale location, a distribution location, or a community co-op location. The payload housing structure may be one of a plurality of payload housing structures. In this regard, the elevated UAV station may be co-located with the plurality of payload housing structures. The elevated UAV station may be arranged adjacent the payload housing structure. Additionally or alternatively, the elevated UAV station may be a standalone structure.

In another example, the elevated UAV station may include a plurality of launch devices arranged on an elevated platform. Each launch device of the plurality of launch devices may be configured to cause a takeoff of the UAV from the elevated platform. The elevated UAV station may include a conveyance device configured to route the payload to a selected launch device of the plurality of launch devices.

In another example, a method is disclosed. The method includes conveying a payload to an elevated platform. The method further includes assembling an unmanned aerial vehicle (UAV) on the platform, including loading the payload. The method further includes launching the UAV to an offsite location, the UAV carrying the payload. The method further includes recovering the UAV at the elevated platform.

In another example, the assembling further include obtaining a fixed-wing assembly from a plurality of fixed-wing assemblies, obtaining a battery assembly from a plurality of battery assemblies, and obtaining a fuselage from a plurality fuselages. Each of the plurality of fixed-wing assemblies, the plurality of battery assemblies, and the plurality of fuselages are stored on elevated platform. The fixed-wing assembly, the battery assembly, and the fuselage may be modular components of the UAV.

In another example, the conveying may further include raising the payload to a platform elevation of the elevated platform. The payload may be stored at a storage elevation below the platform elevation. The conveying further include routing the payload to the UAV at or above the platform elevation.

In another example, the elevated platform may be arranged adjacent a payload housing structure and adapted to store a pluralities of payloads including the payload. In this regard, the conveying may further include receiving the payload within or adjacent the payload housing structure.

In another example, the launching may include accelerating the UAV to cause a takeoff of the UAV from the elevated platform. Further, the recovering may include causing a controlled landing of the UAV at the elevated platform. In some cases, the recovering may further include manipulating a pair of arms between a first position and a second position. The pair of arms may be connected with a wire extending therebetween. The recovering may further include engaging the wire with a hook of the UAV, thereby causing the controlled landing of the UAV at the elevated platform.

In addition to the exemplary aspects and embodiments described above, further aspects and embodiments will become apparent by reference to the drawings and by study of the following description.

DETAILED DESCRIPTION

Figure 1:
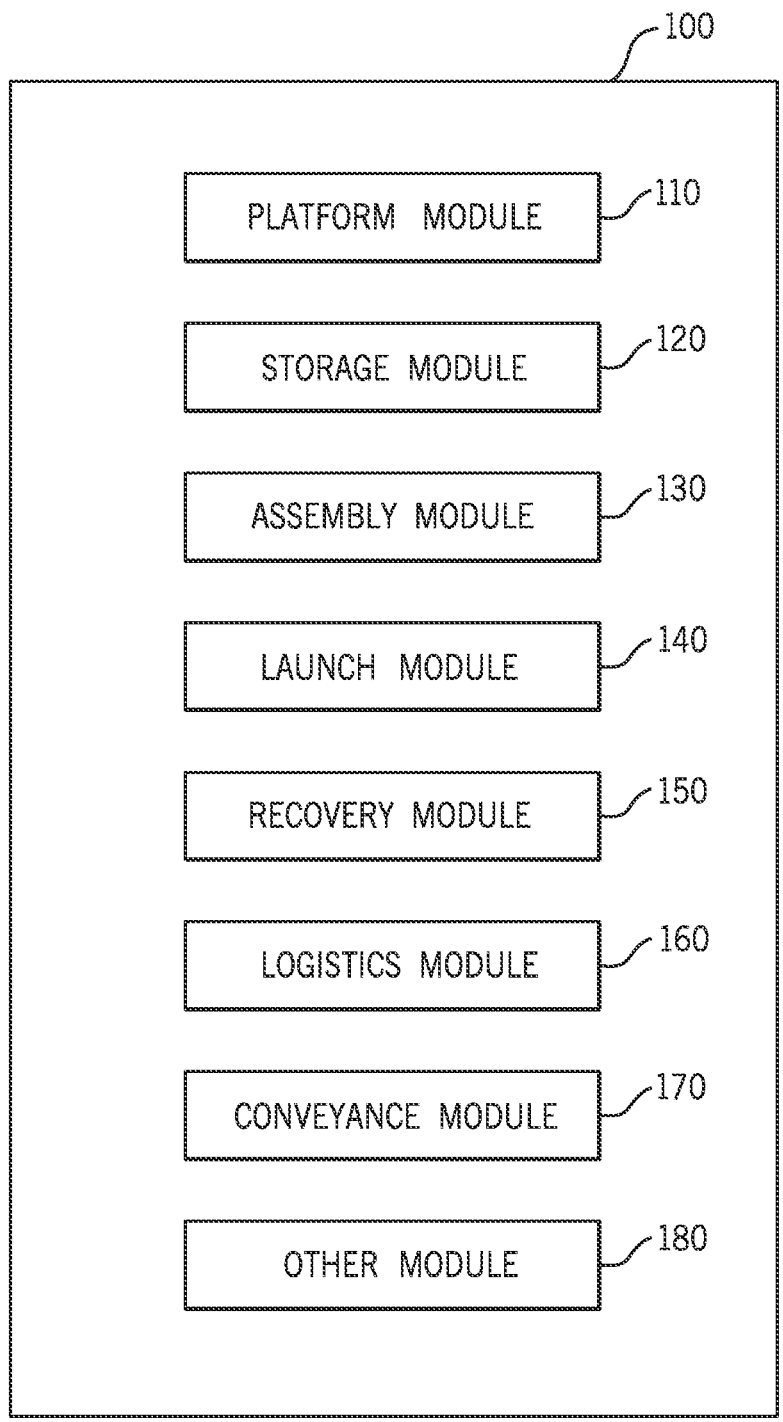
FIG. 1 depicts a functional diagram of a system for payload storage and launch.

The description that follows includes sample systems, methods, and apparatuses that embody various elements of the present disclosure. However, it should be understood that the described disclosure may be practiced in a variety of forms in addition to those described herein.

The following disclosure describes elevated unmanned aerial vehicle (UAV) stations, and systems and methods of operation thereof. A sample elevated UAV station may be adapted to facilitate the launch of an UAV adjacent, near, or in the proximate vicinity of a payload housing structure. Example payload housing structures include, but are not limited to, a retail location, a wholesale location, a distribution location, and/or a community co-op location. The payload housing structure(s) may generally include a plurality of payloads, one or more of which being deliverable to a consumer or other target via the UAV. The elevated UAV station may co-locate with the payload housing structure in order to define a streamlined system for the storage and launch of payloads, on-demand, and adapted to real-time conditions and consumer preferences.

Conventional UAV and manned air vehicle facilities have traditionally limited the ability to co-locate with existing infrastructure, due at least to the required footprint, regulatory or safety setbacks, and the logistical considerations of facility integration. The elevated UAV station, and systems of use thereof, may mitigate such issues in part by providing an elevated platform adjacent, near or in the proximate vicinity of the payload storage structure. The elevated platform allows the elevated UAV station to co-locate with the payload storage structure. For example, the UAVs may be assembled, launched, and recovered on an elevated surface, raised above-grade and having a clearance over pedestrian and vehicular traffic, among other obstacles. With this elevation, the size, footprint, and setback of the elevated UAV station may be optimized over conventional facilitates. As one example, pedestrian and vehicular traffic may be permitted at-grade in closer proximity to the station. In some cases, the elevated UAV station may be elevated sufficiently to allow for pedestrian and vehicular traffic below the station. As such, the elevated UAV may be adapted to co-locate above and/or adjunct a delivery depot of a retail or wholesale location, with semi-truck trailers permitted thereunder.

The efficient co-location of the elevated UAV station and the payload storage structure and can establish a system for storage and launch of payloads. Payloads may include, without limitation, substantially any object that can be delivered to a remote location using a UAV. In this context of a retail location, the payload may include pharmaceutical products, books, toys, kitchen implements, clothes, and/or substantially any other product carried by the retail location and available for purchase (including those purchased at the retail location and elsewhere, such as online, and housed at the location). The system may include a conveyance device or other mechanism adapted to convey the payload to the elevated UAV station. Sample conveyance devices include dumbwaiters, belt conveyors, pneumatic conveyors, and other mechanisms that may facilitate both a vertical and/or horizontal conveyance of the payload. As explained herein, the payload storage structure may receive an order for the payload, such as via an online commerce portal, remote ordering system, and so on. The payload may be selected based on the received order and conveyed to the elevated UAV platform accordingly, using the conveyance device.

Many constructions of the elevated UAV platform are contemplated herein. For the sake of illustration, the elevated platform may include a logistics zone, a launch device, and a recovery device. The logistics zone may be adapted to facilitate the loading of the payload onto the UAV. For example, the logistics zone may store one or more UAVs and the payload may be loaded onto the UAV at the logistics zone. The UAV may include substantially any type of aerial vehicle, including fixed-wing aerial vehicles, helicopter-type aerial vehicles, and so on. The UAV may be a UAV having a modular construction, e.g., having interchangeable components, and thus the UAV itself may be assembled at the logistics zone. As one illustration, the UAV may include a modular collection of fixed-wing assemblies, battery assemblies, and fuselages. These and other components may be assembled to build a UAV at the elevated platform. This modular approach can enhance the adaptability of the system. Once loaded with the payload, the UAV may be engaged with the launch device. The launch device may be adapted to cause a takeoff of the UAV, including accelerating the UAV to a velocity that allows the UAV to commence flight. The UAV may deliver the payload to the intended target and return to the elevated UAV platform. The recovery device may be adapted to cause a controlled landing of the UAV, including engaging one or more wires or other catch mechanisms to decelerate the UAV for landing. In some cases, multiple launch devices and/or multiple recovery devices may be integrated into a single platform. This may further increase efficiencies where the elevated UAV platform is co-located with multiple payload storage structures.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts a functional diagram of a system 100, such as the system discussed above and described in greater detail below. The system 100 may be adapted for payload storage and launch. For example, the system 100 may include an elevated UAV station and payload structure co-located with one another. The elevated UAV structure may be adapted to receive a payload from the payload storage structure, and launch the payload (via a UAV) to a remote location. Many constructions and implementations of the system 100 are possible and contemplated herein. Broadly to facilitate the foregoing functionality, the system 100 may include one or more of a platform module 110, a storage module 120, an assembly module 130, a launch module 140, a recovery module 150, a logistics module 160, a conveyance module 170, and/or another module 180. One or more of the following modules may cooperate with one another to facilitate the storage and launch of a payload, as described herein. While specific example of components, structures, assemblies, subassemblies, and so on are described for each module below, this is presented for purposes of illustration. It will be appreciated that at least some of the following modules may have overlapping or complementary functionality, and that certain components, structures, assemblies, subassemblies, and so one described with respect to one module may be included in others modules without departing from the scope and spirit of the invention.

With respect to the platform module 110, the system 100 may include various structures that facilitate the takeoff and recovery of UAVs. For example, a platform module 110 may include a platform structure physically capable of supporting various different UAV launch and recovery devices. For example, the platform structure may be constructed from various structural steels or other materials that support a deck for supporting the various devices and equipment of the system 100. The platform structure may be elevated, as described herein. In this regard, the platform module 110 may include supports that hold the deck above-grade. The supports can help define the platform structure as a free-standing structure. Additionally or alternatively, the supports may be used to install the platform structure adjacent the payload storage structure. Other structures associated with the platform module 110 include navigation beacons, canopies, riggings, audio warning systems, safety systems, including fire suppression systems, and so on as needed to facilitate the support and operation of the UAVs and payload launch operations.

With respect to the storage module 120, the system 100 may include various structures that house or store a payload. The structure may, in certain cases, be an existing retail or wholesale location. More broadly, the structure housing the payload may be a location where payloads or good are sold or otherwise exchanged. The structure, however, need not be purposed for retail sales. In other cases, the structures of the storage module 120 may be or be associated with a drop location, kiosk, or other location in which a user may provide a payload for temporary storage and subsequent launch by the system 100. In this regard and without limitation, the storage module 120 may include a retail location, a wholesale location, a distribution center, a community co-op location, among other possibilities.

With respect to the assembly module 130, the system 100 may be adapted to assemble a UAV on the platform. The system 100 may further be adapted to load the assembled UAV on the platform with the selected payload. In this regard, the assembly module 130 may include the components required in order to assemble the UAV. For example, the assembly module 130 may include a plurality of fixed-wing assemblies, a plurality of battery assemblies, and plurality of fuselages, among other components. The components may generally be modular and interchangeable, allowing the UAV to be constructed as having any fixed-wing assembly of the plurality of fixed-wing assemblies, any battery assembly of the plurality of battery assemblies, and any fuselage of any of the plurality of fuselages. The assembly module 130 may also include various canopies, tables, rails, racks, and so to facilitate the loading of the payload into the UAV.

With respect to the launch module or launch area 140, the system 100 may be adapted to cause a takeoff of the UAV. For example, the launch area or launch module 140 may include certain launch devices or other systems that can be used to accelerate the UAV off the platform structure. The acceleration may be tuned in order to safely move the UAV away the payload structure and pedestrian and vehicular traffic below. With respect to the recovery module 150, the system 100 may be adapted to cause a controlled landing of the UAV. In this regard, the recovery module 150 may implement various recovery devices that operate to engage the UAV upon the decent of the UAV towards the platform structure. In this regard, the UAV may land on the elevated platform. Landing on the elevated platform may allow the UAV to be readily dissembled and prepared for a delivery of a subsequent payload. Landing on the elevated platform may also help reduce or eliminate the regulatory or safety set-backs around the elevated platform, as the UAV remain above a platform elevation at all times during descent.

With respect to the conveyance module 170, the system 100 may be or include one or more devices that convey the payload from the storage module 120 and to the platform module 110. In this regard, the payload may be stored at a different elevation than the elevation of the platform structure of the platform module 110. For example, the payload may be stored at a storage elevation of the payload storage structure. Such a location may be at grade, such as the elevation of goods presented in a retail location. The conveyance devices of the conveyance module 170 may receive the payload and transport or convey the payload vertical from the storage elevation to a platform elevation of the elevated platform. The conveyance module 170 may also include a device to facilitate the substantially horizontal conveyance of the payload, either at the storage elevation, the platform elevation, or therebetween. This can allow the location at which the conveyance module 170 receives the payload to be different elevationally and plan than the location at which the payload is loaded into the UAV. With respect to the other module 180, the system 100 may include substantially any other structures to facilitate the foregoing functionality of the system described herein. For the sake of non-limiting illustration, the other module may include ramps, trailer docks, or other structures to facilitate the loading of payloads, safety systems, computer interfaces, and so on.

Figure 2A:
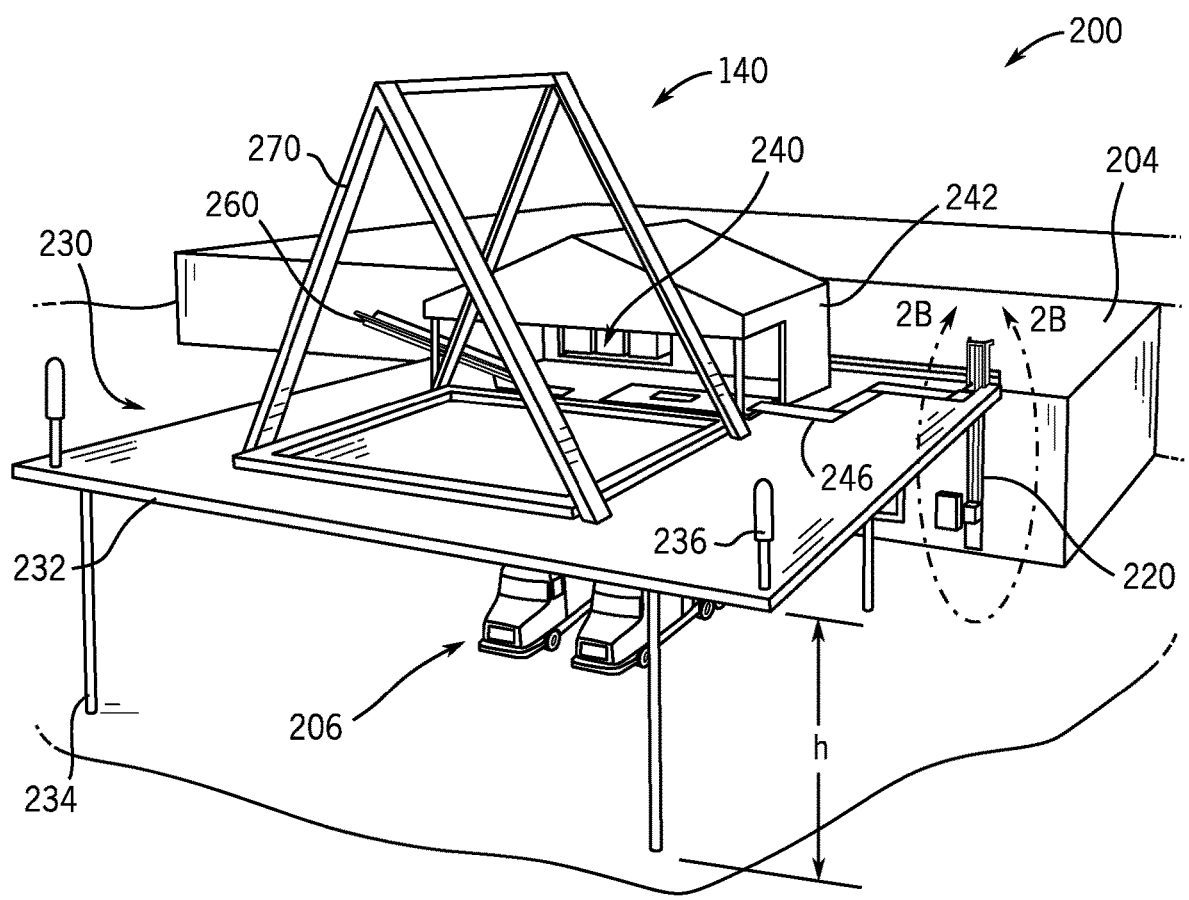
FIG. 2A depicts an example implementation of the system of FIG. 1, including an elevated UAV station adjacent a payload storage structure.

FIG. 2A depicts a system 200. The system 200 may be an example implementation of the system 100 described above with respect to FIG. 1. In this regard, the system 200 may include one or more of the platform module 110, the storage module 120, the assembly module 130, the launch module 140, the recovery module 150, the logistics module 160, the conveyance module 170, and/or the other module 180. As such, the system 200 may perform any or all or the functions described above with respect to the system 100, and include any of the components, structures, assemblies, subassemblies, described above.

For example, the system is shown as including an elevated UAV station 230 and a payload storage structure 204. The elevated UAV station 230 may be adapted to receive a payload from the payload storage structure 204 and facilitate launch of the payload using a UAV. Accordingly, the system 200 may include a conveyance device 220. The conveyance device 220 may include one or more of dumbwaiter, a belt conveyor, a pneumatic conveyor or the like. The conveyance device 220 may generally receive a payload at a grade elevation associated with the payload storage structure 204 and raise the payload to the elevated UAV station 230. A secondary conveyor device 246 is also provided and arranged at the platform grade in order to route the payload to a UAV or assembly or loading zone.

The elevated UAV station 230 is shown in FIG. 2A as constructed adjacent the payload storage structure 204. The elevated UAV station 230 is adjacent and co-located with the payload storage structure 204 in a manner that facilities efficient transfer of payloads from the payload storage structure 204 to the elevated UAV station 230. As one example shown in FIG. 2A, the elevated UAV station 230 is constructed substantially above a delivery depot 206. The delivery depot 206 may be a loading and receiving section of the payload storage structure 204, for example, where the payload storage structure 204 is a warehouse or retail location. Accordingly, the elevated UAV station 230 may be constructed to have a platform or elevated platform 232 with a platform elevation above-grade, e.g., raised above a surface sufficiently high to allow pedestrian and vehicular traffic on the surface below, by at least a distance h. The distance h, for example, may be at least 14 feet above grade in order to accommodate semi-trailer trucks thereunder. In this regard, the elevated UAV station 230 may have supports 234 at least 14 feet or longer to support the elevated platform or platform 232. The supports 234 may be fabricated from structure steel or other materials in order to support the platform 232 and operations conducted thereon. Navigational beacons 236 may also be provided on the platform 232.

The system 200 is also shown as including a logistics zone 240, a canopy 242, a launch device 260, and a recovery device 270. As described below in greater detail with reference to FIG. 3, the logistics zone 240 may be a zone or module of the elevated UAV station 230 that facilitates the assembly of a UAV and loading of the UAV with the payload. The canopy 242 may provide protection from environmental elements during the assembly and loading. As described below in greater detail with reference to FIG. 4, the launch device 260 may be a device or system adapted to cause a takeoff of the UAV. The recovery device may be a device or system that is adapted to cause the controlled landing of the UAV on the elevated UAV station 230.

Figure 2B:
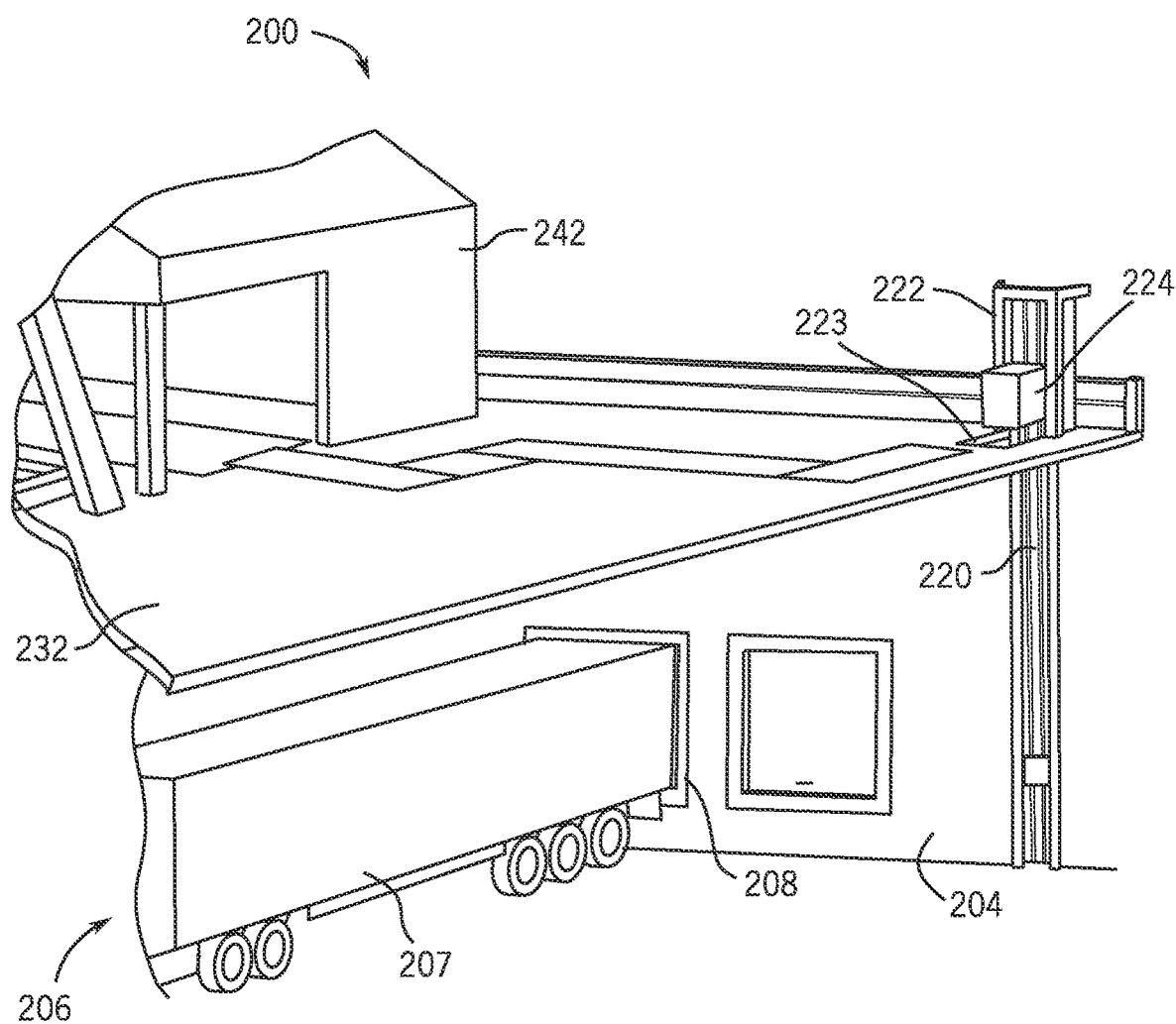
FIG. 2B depicts detail 2B-2B of FIG. 2A.

FIG. 2B depicts detail 2B-2B of FIG. 2A. In the detail view, the conveyance device 220 is shown as including a track 222 and a carriage 224. The track 222 may extend from the storage elevation of the payload storage structure 204 and to the platform elevation of the platform 232. In some cases, the track 222 may extend through an opening 223 defined in the platform 232. The carriage 224 may be adapted to travel the track 222 between the respective elevations carrying the payload. In this regard, the conveyance device 220 may include various mechanisms, pulleys, ropes, lifts, and so on, not shown in FIG. 2B in the interest of clarity, to facilitate the movement of the carriage 224.

With further reference to the detail view of FIG. 2B, the platform 232 is shown arranged above the delivery depot 206. The delivery depot 206 may be a section of the payload storage structure 204 that is configured to receive semi-trailer trucks 207 for the delivery of goods in bulk. For example, the payload storage structure 204 may include dock doors 208 for receipt of the semi-trailer trucks 207. The arrangement of the platform 232 above the delivery depot 206 may maximize the efficiency of product obtainment and placing for delivery with a UAV. For example, the delivery depot 206 may be associated with a section of the payload storage structure 204 that includes the infrastructure needed for packaging and selecting a product of delivery and that may be generally shielded or obscured from the general public within the payload storage structure 204.

Figure 2C:
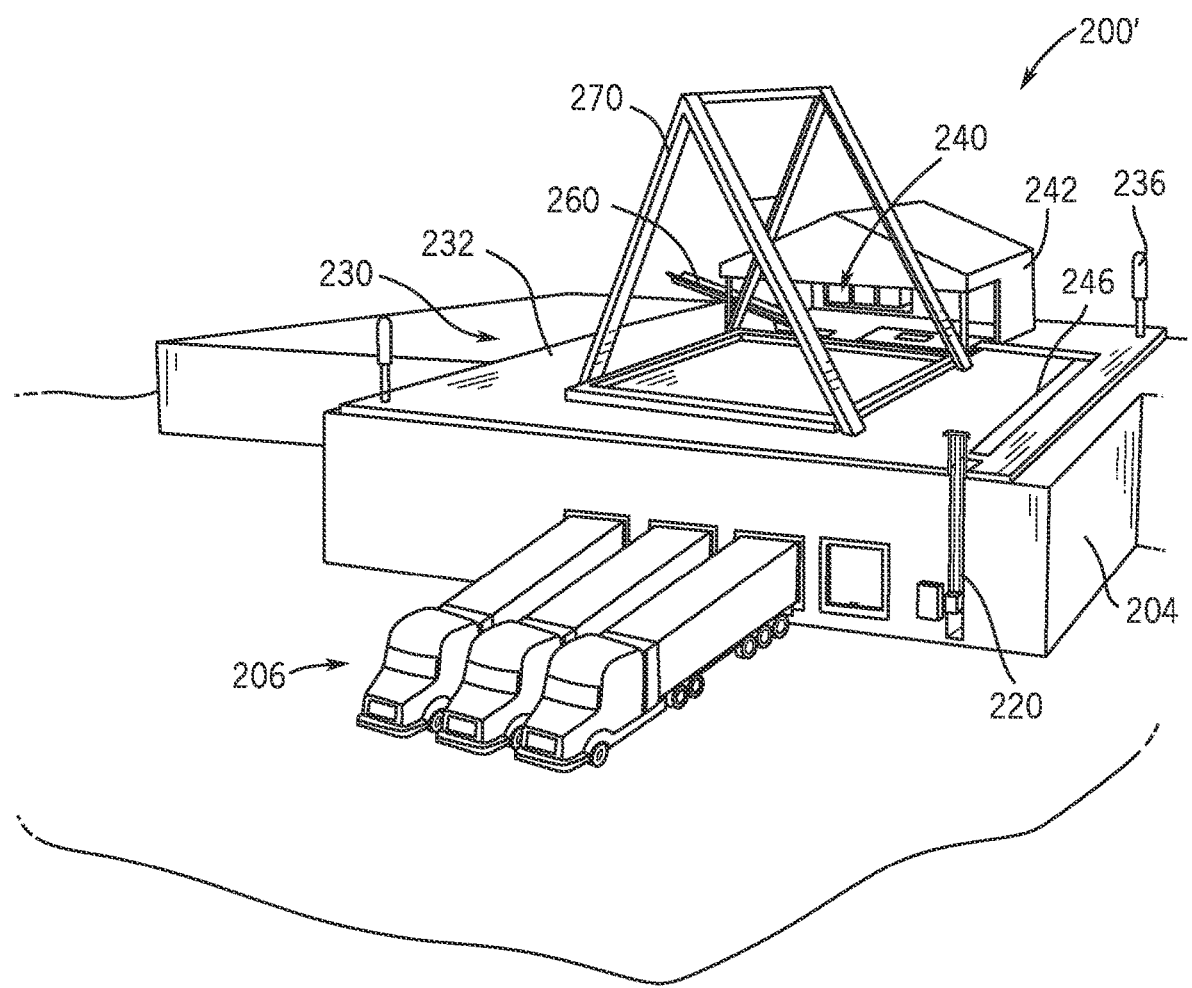
FIG. 2C depicts another example implementation of the system of FIG. 1, including the elevated UAV station arranged over the payload storage structure.
Figure 2D:
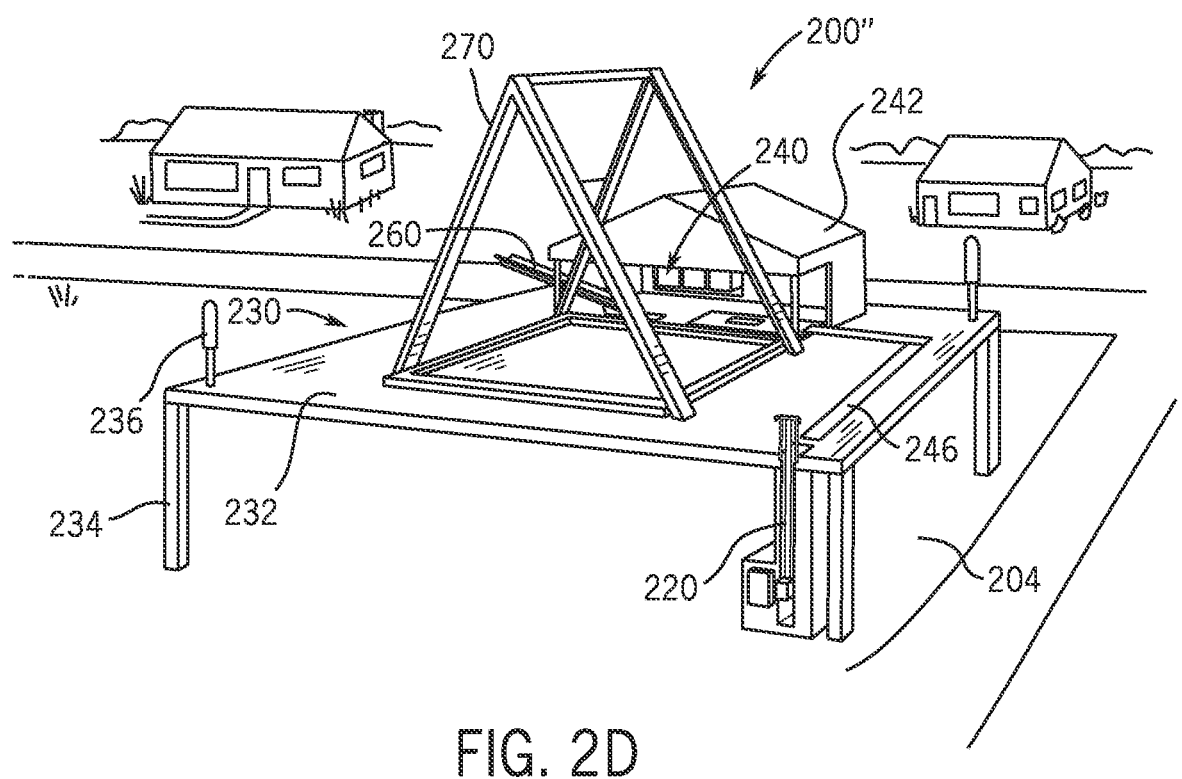
FIG. 2D depicts another example implementation of the system of FIG. 1, including the elevated UAV station as a freestanding structure.

The elevated UAV station 230 may also be co-located with the payload storage structure 204 in a variety of other manners. For example and with reference FIG. 2C, a system 200' is shown with the elevated UAV station 230 arranged substantially on a roof of the payload storage structure 204. In yet other cases, the elevated UAV station 230 may be a substantially standalone structure. For example and with reference to FIG. 2D, a system 200" is shown with the elevated UAV station 230 arranged as a standalone structure and associated with a neighborhood. In this regard, the elevated UAV station 230 in FIG. 2D may be associated with a community co-op location in which the elevated UAV station is used to launch payloads substantially on-demand, and may function as a delivery service or the like.

Figure 3:
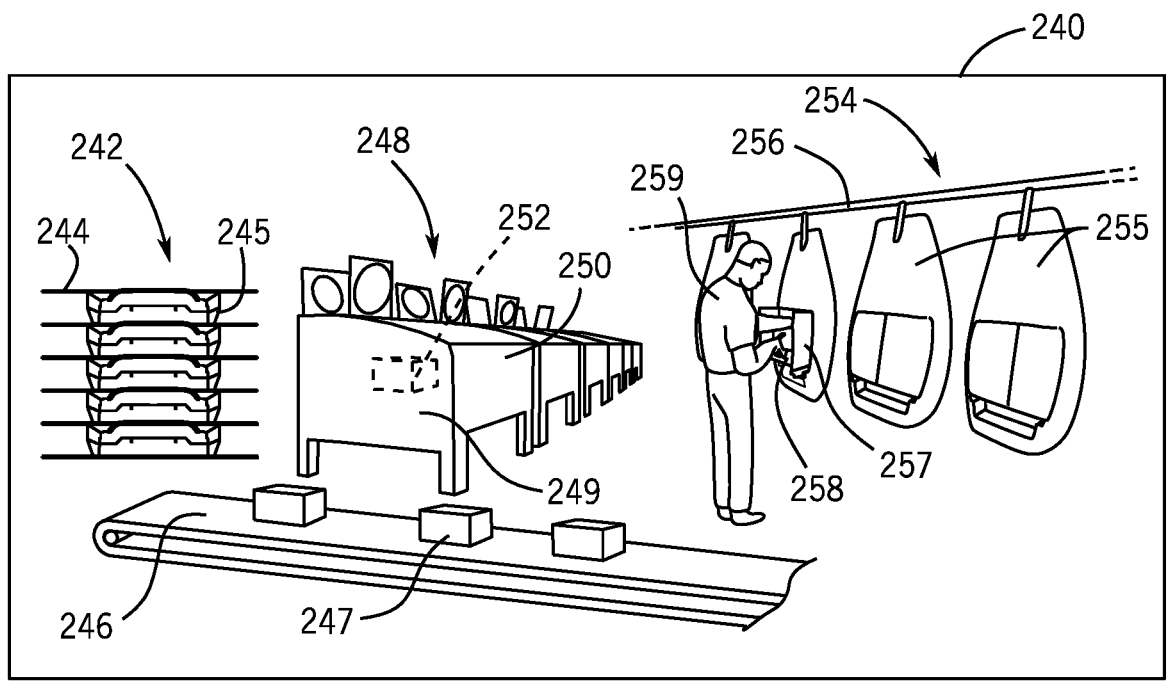
FIG. 3 depicts a logistics zone of the elevated UAV station of FIG. 2A.
Figure 4:
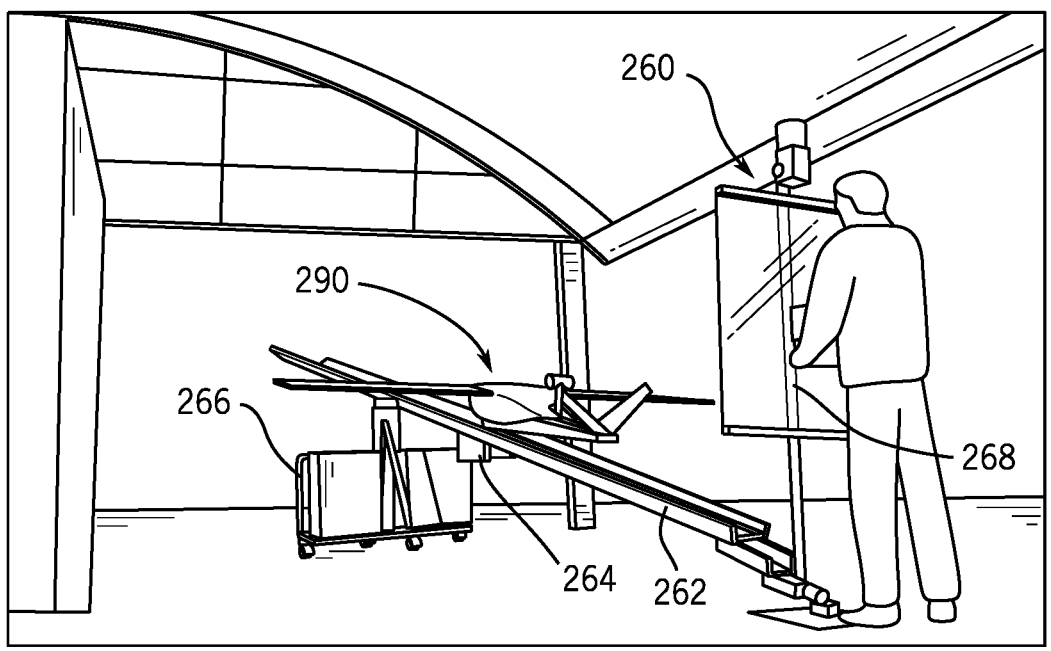
FIG. 4 depicts a launch device of the elevated UAV station of FIG. 2A.
Figure 5:
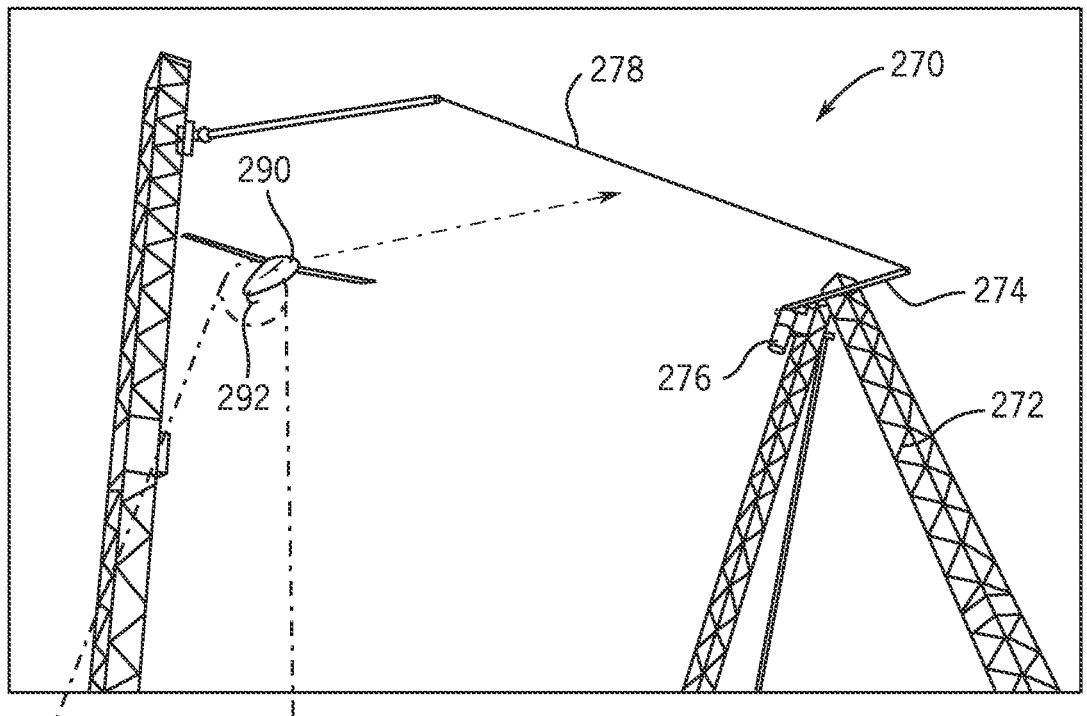
FIG. 5 depicts a recovery device of the elevated UAV station of FIG. 2A.
Figure 5:
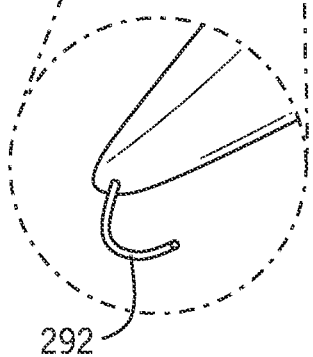

Turning to FIGS. 3-5, sample configurations of the logistics zone 240, the launch device 260, and the recovery device 270 are shown. With reference to FIG. 3, the logistics zone 240 is shown. Broadly, the logistics zone 240 may be adapted and include some or all of the components typically required to assemble and load a UAV. In the example of FIG. 3, the logistics zone 240 includes a fixed-wing storage 244, a battery storage 248, and fuselage storage 254. The fixed-wing storage 244 may include a rack 245 that stores a plurality of fixed-wing assemblies 244. The battery storage 248 may include a table 249 that supports a plurality of docking stations 250 having a corresponding plurality of battery assemblies 252. The fuselage storage 254 may include a rail 256 that arranges a plurality of fuselages 255. Each fuselage may include doors 257 and a cargo hold 258. A user 259 may manipulate the doors 257 and load a payload 247 into the cargo hold 258. For example, the payload 247 may advance into the logistics zone 240 via the conveyance device 246 and allow the user 259 to readily place the payload 247 into cargo hold 258.

The UAVs may be modularly assembled devices. For example and with reference to FIGS. 3 and 4, a UAV 290 may include any fixed-wing assembly of the plurality of fixed-wing assemblies 244, any battery assembly of the plurality of battery assemblies 252, and any fuselage of the plurality of fuselages 255. The UAV 290 may be assembled and engaged with the launch device 260 shown in FIG. 4. The launch device 260 may include a track 262, a pulley 264, a power source 266, and controls 268, among other components. While many devices are contemplated for use with the elevated platform, the launch device 260 uses the pulley 264 to accelerate the UAV 290 along the track 262. For example, the pulley 264 may include an engagement feature integrated within the track and engaged with the UAV 290. An operator may activate the launch device 260 at the controls 268. In response, the power source 266 may cause the pulley to manipulate the engagement feature and accelerate the engagement feature and engaged UAV 290 along the track 262. The acceleration may cause the UAV 290 to reach a velocity that allows the UAV 290 to takeoff from the elevated platform 232.

With reference to FIG. 5, a sample implementation of the recovery device 270 is shown. The sample recovery device 270 is shown in FIG. 5 as including supports 272, arms 274, an actuator 276, and a wire 278. The recovery device 270 may be arranged on the elevated platform 232. The UAV 290 may approached the recovery device 270 on the elevated platform 232. The recovery device 270 may be configured to cause a controlled landing of the UAV, allowing the UAV, a fixed-wing aerial vehicle, to land above-grade and at a space co-located with a payload storage structure, such as a retail location.

To facilitate the foregoing, a pair of the supports 272 may support one of the arms 274. The wire 278 may extend between the arms 274 opposite the supports 272. The actuator 276 may cause the arms 274 to be manipulated between a first configuration and a second configuration. In the second configuration shown in FIG. 5, the arms 174 are actuated upwardly in order to arrange the wire within the flight path of the UAV 290. The UAV 290 may have a hook 292 attached to a tail of the UAV 290. The UAV 290 may continue towards to the wire 278 and engagement wire 278 with the hook 292. This engagement may cease the forward travel of the UAV 290 and cause a controlled landing of the UAV 290 on the elevated platform 232.

Figure 6A:
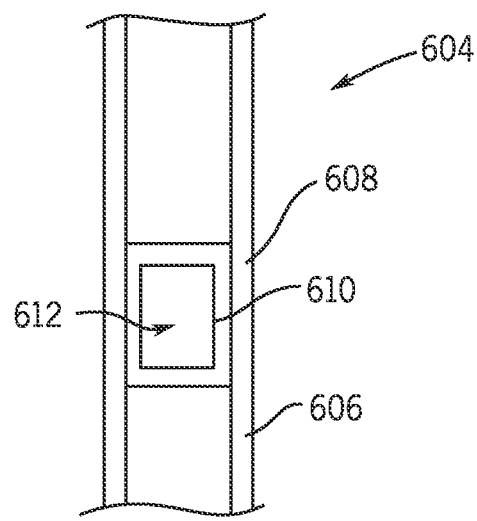
FIG. 6A depicts a schematic view of an example conveyance device.
Figure 6B:
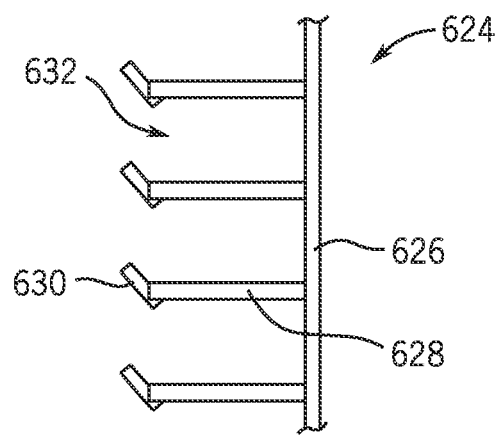
FIG. 6B depicts a schematic view of another example conveyance device.
Figure 6C:
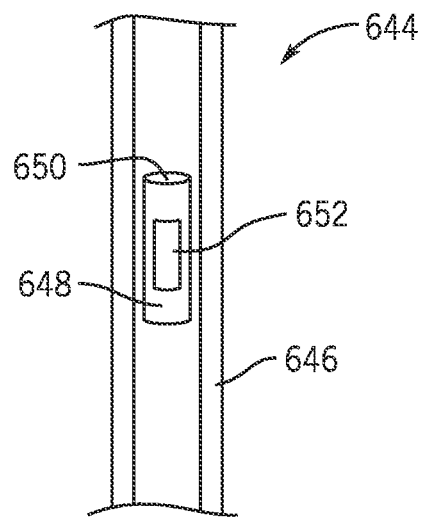
FIG. 6C depicts a schematic view of another example conveyance device.

As described herein, the conveyance devices of the present disclosure may be constructed from a variety of difference mechanisms. FIGS. 6A-6C show sample conveyance mechanism that may be used with the elevated UAV stations described herein. With reference to FIG. 6A, a conveyance device 604 is shown. The conveyance device 604 may be a dumbwaiter or elevator-type device. In this regard, the conveyance device 604 is shown as including a track 606, an elevator 608, a door 610, and a cargo enclosure 612. The conveyance device 604 may generally operate by moving the elevator 608 along track 606. For example, a pulley system having an electrically actuated motor may be used. The door 610 may enclose a payload within the elevator 608.

With reference to FIG. 6B, a conveyance device 624 is shown. The conveyance device 624 may be a belt-type conveyor. In this regard, the conveyance device 624 is shown as including a belt 626, shelves 628, and lips 630. Each of the shelves 628 may define a cargo zone 632. The belt 626 may be progressed, such as along a pulley, thereby moving the shelves 628 and corresponding cargo zones 632. In this regard, the conveyance device 624 may also include an electrically actuated motor. The lips 630 may help retain the payload in substantially within the cargo zone 632 during conveyance.

With reference to FIG. 6C, a conveyance device 644 is shown. The conveyance device 644 may be a vacuum-type conveyance device. In this regard, the conveyance device 644 is shown as including a conduit 646, a shuttle 648, an access 650, and a cargo enclosure 652. The conduit 646 may utilize pneumatic pressure in order to move the shuttle between a first and second location, such as a first and second elevation. The shuttle 648 may be tubular in shape and include the access 650 at one or both ends. The access 650 may be manipulated to allow a payload to be loaded and retained from the cargo enclosure within the shuttle 648.

Figure 7A:
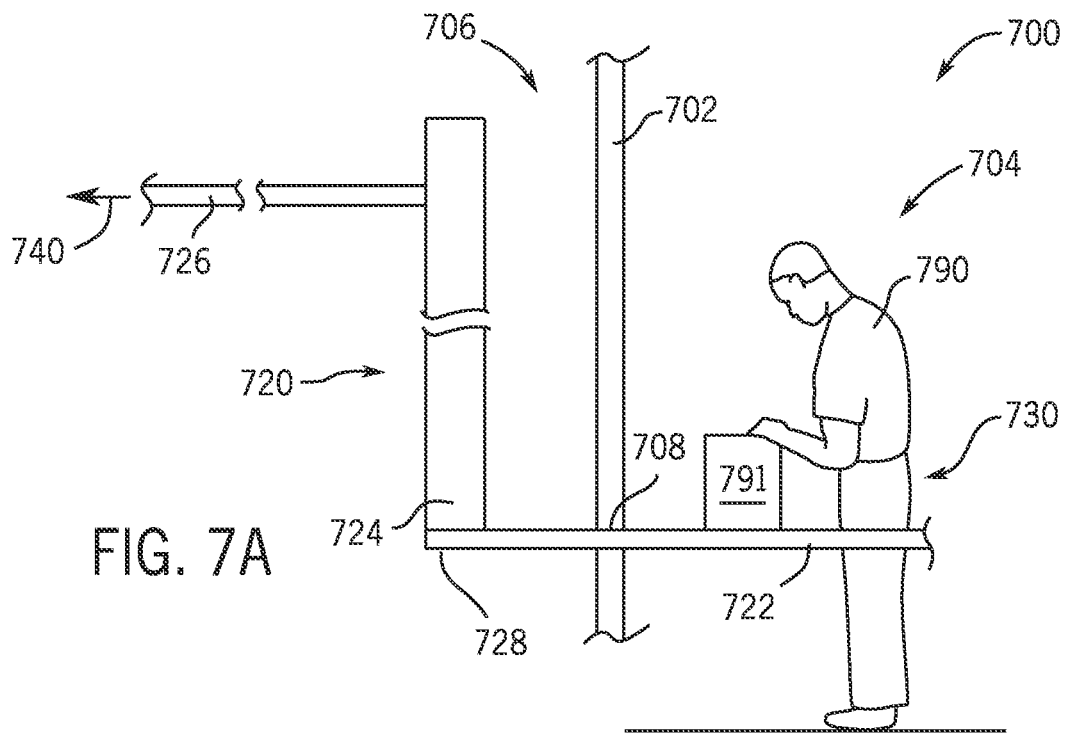
FIG. 7A depicts a schematic view of an example system for conveying a payload to an elevated UAV station.

Conveyance mechanisms of the present disclosure may also be integrated with a payload storage structure. For example, the conveyance mechanism may traverse between an internal environment of the structure and an external environment, allowing the payload to be received by the conveyance device within the structure. For example and as shown in FIG. 7A, a system 700 includes a barrier 702 that separates an internal environment 704 of the payload receiving structure from an external environment 706. A conveyance device 720, such as the conveyance devices discussed above, extends from the internal environment 704 to the external environment, and toward an elevated UAV station 740. For example, the barrier 702 may have an opening 708 and the conveyance device 720 extend through the opening 708. The conveyance device 720 may include a dumbwaiter device, a belt conveyor, pneumatic conveyor, or the like, or any combination thereof.

The sample conveyance device 720 is shown in FIG. 7A as including a loading section 722, an elevation section 724, and a routing section 726. The loading section 722 may allow a user 790 to load a payload 791 onto the conveyance device 720 at an internal loading station 730 within the internal environment 704. The loading section 722 may generally convey the payload from the internal environment and into the external environment 706. The elevation section 724 may be coupled to the loading section, such as via transition section 728, and generally operate to convey the payload 791 to a higher elevation. Finally, the routing section 726 may generally convey the payload to the UAV or other loading or assembling zone of the elevated UAV station.

Figure 7B:
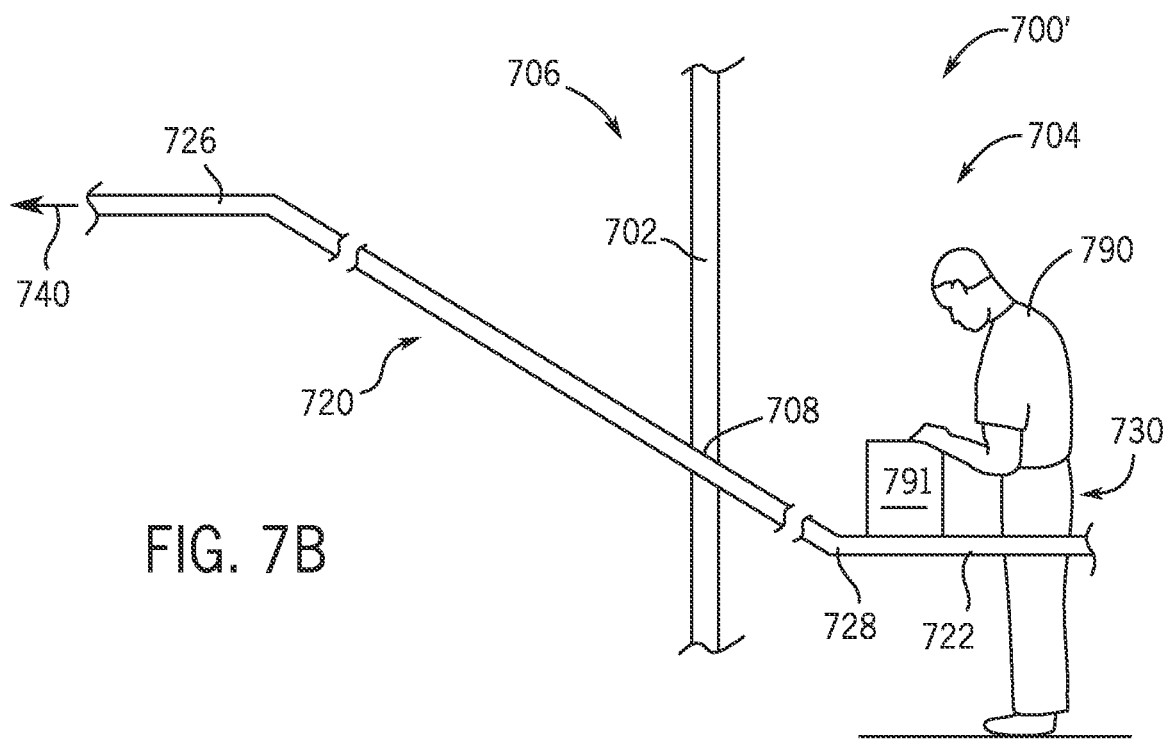
FIG. 7B depicts a schematic view of another example system for conveying a payload to an elevated UAV station.

In the example of FIG. 7A, the conveyance device 720 is shown in which the elevation section 724 conveys the payload 791 in a vertical direction. In some cases, as shown in the sample system 700' of FIG. 7B, the elevation section 724 conveys the payload 791 in both a vertical and horizontal direction. This may be the case where the conveyance mechanism comprises a belt conveyor and the elevation section 724 conveys the payload 791 along a ramp-type path.

Figure 8A:
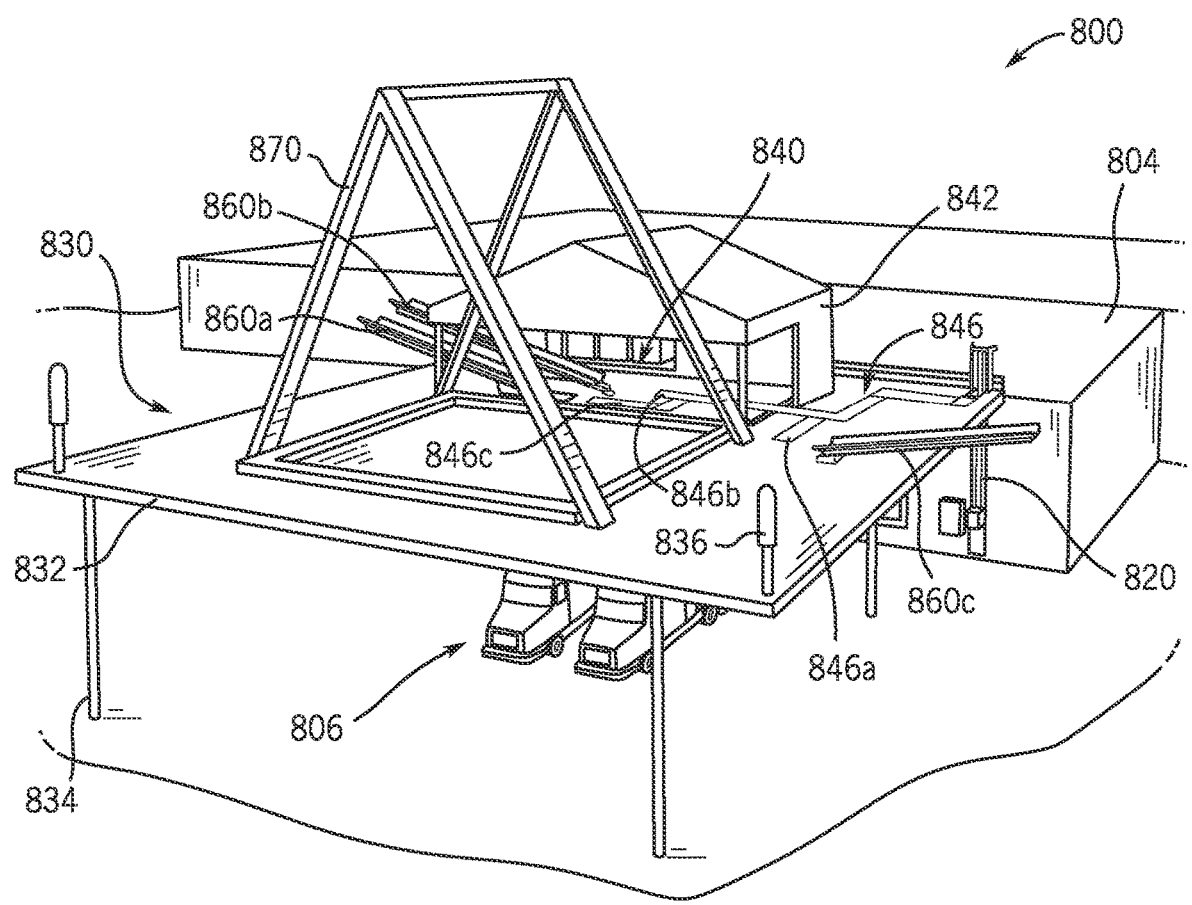
FIG. 8A depicts an example implementation of the system of FIG. 1, including an elevated UAV station having multiple launch devices and arranged adjacent a payload storage structure.
Figure 8B:
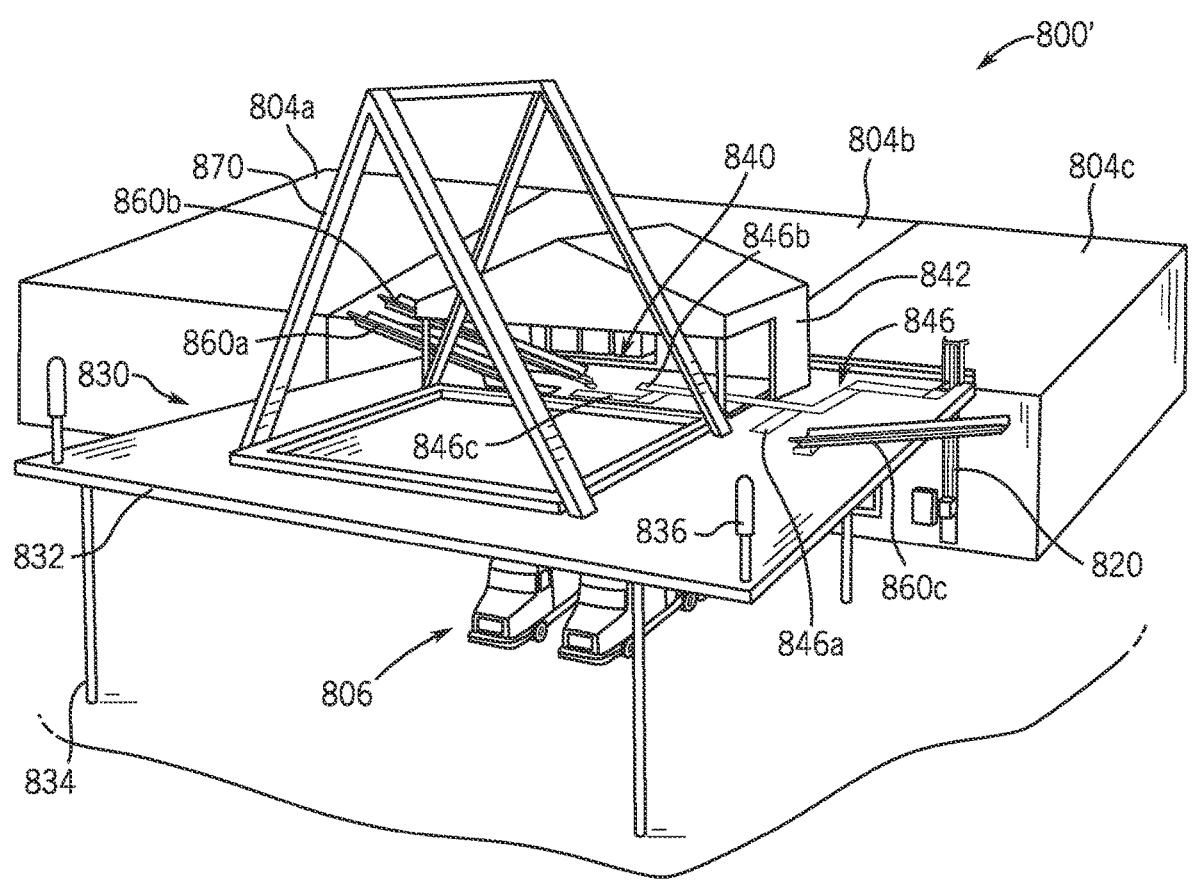
FIG. 8B depicts the system of FIG. 8A having multiple payload storage structures adjacent the elevated UAV station.

Turning to FIG. 8A, a system 800 is shown including a payload storage structure 804 and an elevated UAV station 230. The system 800 may be substantially analogous to the system 200 and include a delivery depot 806, a conveyance device 820, a platform 832, supports 834, navigational beacons 836, a logistics zone 840, a canopy 842, a secondary conveyance device 846, and a recovery device 870. The elevated UAV station 830 includes multiple launch devices, a first launch device 860a, a second launch device 860b, and a third launch device 860c. In this regard, the elevated UAV station 830 may be adapted to cause the takeoff of multiple UAV simultaneously or otherwise in rapid succession. Multiple conveyance mechanisms may feed each of the launch devices. For example and as shown in FIG. 8A, the conveyance mechanism 846 may include a first branch 846a, a second branch 846b, and a third branch 846c associated with a respective one of the launch devices 860a, 860b, and 860c. In some cases, the multiple launch devices of the elevated UAV station 230 may facilitate co-location of the station 230 with multiple retail locations. In this regard, FIG. 8B depicts a system 800' in which the elevated UAV station 830 is associated with a first payload storage structure 804a, a second payload storage structure 804b, and a third payload storage structure 804c.

Figure 9:
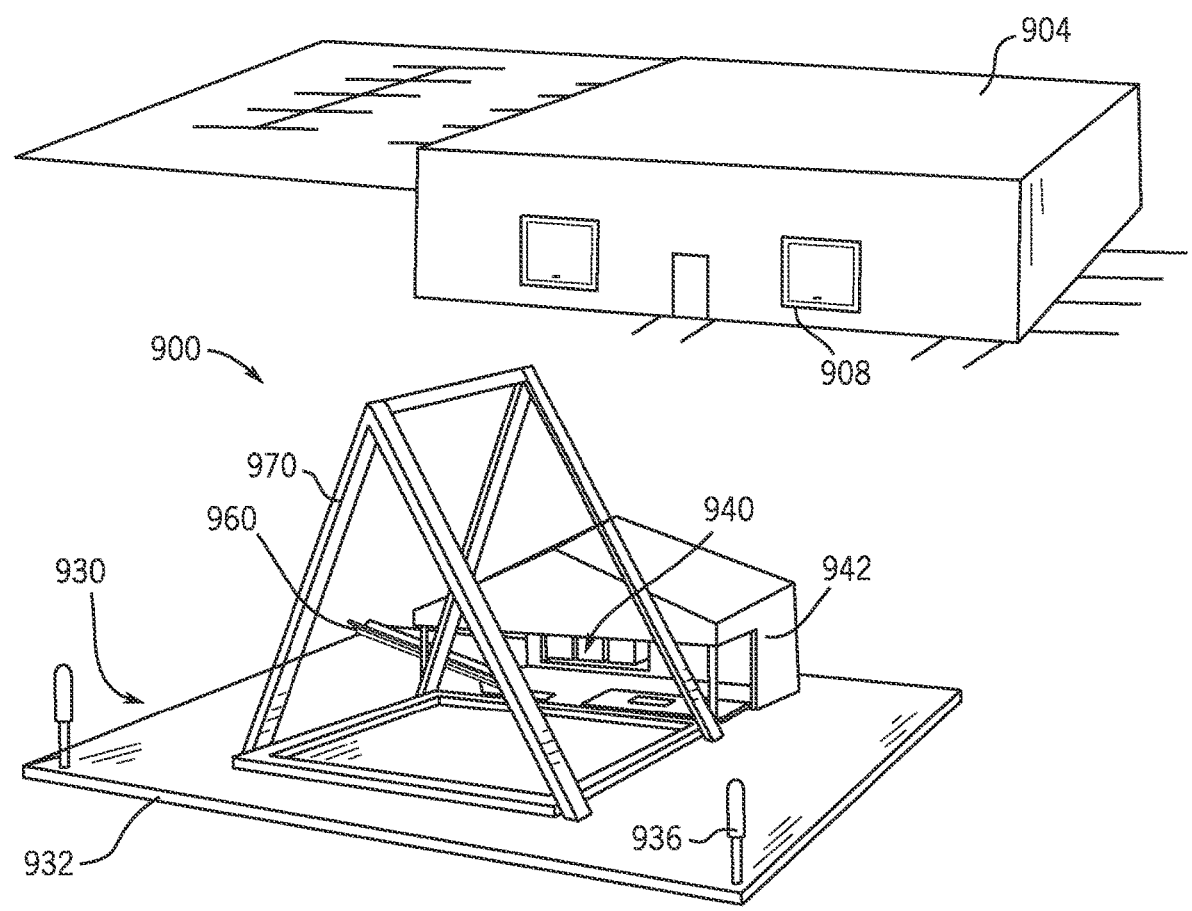
FIG. 9 depicts an example implementation of the system of FIG. 1, including a UAV station within the vicinity of a payload storage structure.

FIG. 9 depicts a system 900 in which a sample UAV station 930 is co-located at-grade and adjacent a payload storage structure 904 including an opening 908. The system 900 may be substantially analogous to the system 200 and include a platform 932, navigational beacons 936, a logistics zone 940, a canopy 942, launch device 960, and a recovery device 970.

Figure 10:
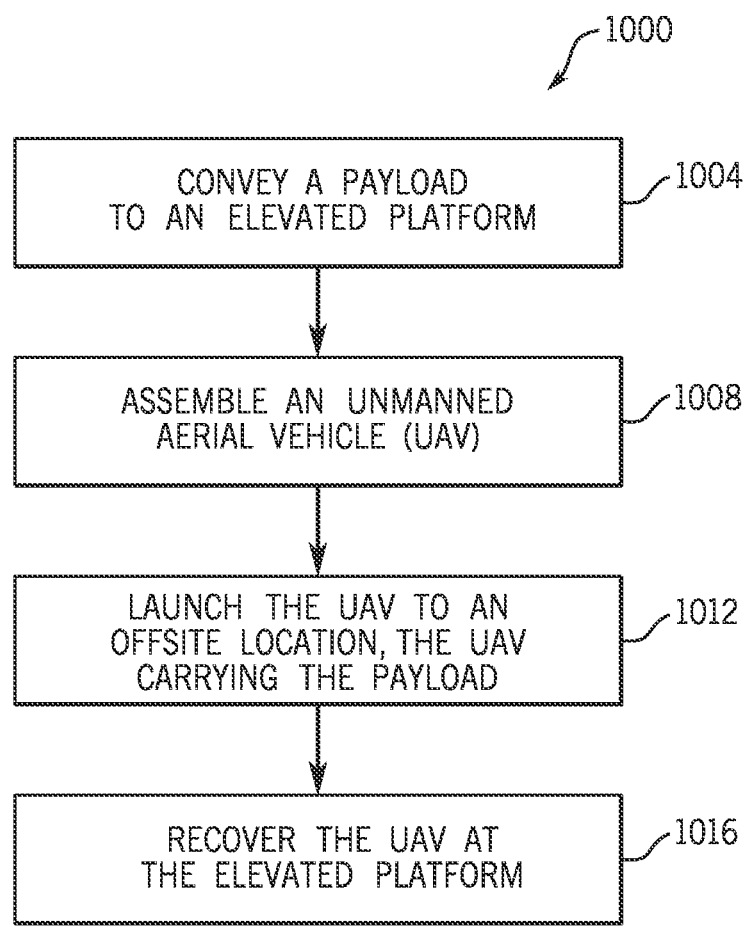
FIG. 10 depicts a flow diagram for operating an elevated UAV station.

Reference is now made to the flow diagram in FIG. 10, which illustrates process 1000. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 10, process 1000 relates generally to a method for operating an elevated UAV station. The process 1000 may be used with any of the operating an elevated UAV stations and systems described herein, for example, such as the elevated UAV stations 230, 830, 930 and/or systems 100, 200, 200', 200'', 800, 800', and 900, and variations and combinations thereof.

At operation 1004, a payload is conveyed to an elevated platform. For example and with reference to FIGS. 2A and 3, the payload 247 is conveyed to the elevated platform 232. The payload 247 may be conveyed to the elevated platform 232 using the conveyance device 220. In this regard, the payload 247 may be conveyed from a storage elevation to a platform elevation. A dumbwaiter, a belt conveyor, a pneumatic conveyor or the like may be used.

The payload 247 may be conveyed to the elevated platform 232 in response to an order or other indication that the payload 247 is to be delivered via the UAV to a remote user. In one example, the payload 247 may be a good for sale or otherwise stored within the payload storage structure 204, such as pharmaceutical products, books, toys, kitchen implements, clothes, and/or substantially any other product carried by the retail location and available for purchase (including those purchased at the retail location and elsewhere, such as online, and housed at the location). The payload 247 may be selected from the inventory of the payload storage structure 204 and packaged for shipment via the UAV 290. This may include packing the payload 247 in a manner that allows the payload 247 to be delivered from the UAV 290 via a parachute.

At operation 1008, a UAV is assembled on the elevated platform, including loading the payload. For example and with reference to FIGS. 2A and 3, a UAV may be assembled from a fixed-wing assembly 244, a battery assembly 252, and a fuselage 255, among other components. The fixed-wing assembly 244, the battery assembly 252, and the fuselage 255 may each be storage on the elevated platform. The fuselage 255 may be loaded with the payload 247. For example, the user 259 may manipulate doors 257 on the fuselage 255 and load the payload 247 into the cargo hold 258.

At operation 1012, the UAV is launched to an offsite location. The UAV carries the payload. For example and with reference to FIGS. 2A and 4, the UAV 290 may be engaged with the launch device 260, such as at the track 262. A user may operate the controls 268 in order to actuate a pulley system 264 that causes the UAV 290 to accelerate along the track 262. The pulley system 264 may accelerate the UAV 290 along the track 262 so that the UAV 290 reaches a velocity that allows the UAV to takeoff from the elevated platform.

At operation 1016, the UAV is recovered at the elevated platform. For example and with reference to FIGS. 2A and 5, the UAV 290 may be recovered on the elevated platform 232 using the recovery device 270. The wire 278 may extend between the arms 274. The arms 274 are manipulated via the actuator 276 in order to arrange the wire within the flightpath of the UAV 290. The hook 292 of the UAV 290 is adapted to catch the wire 278. Upon the catch of the wire 278 by the hook 292, the UAV may cease forward travel. The recovery device 270 may thus cause a controlled landing of the UAV 290 on the elevated platform 232.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. An elevated unmanned aerial vehicle (UAV) station, comprising:
   an elevated structure for receiving and docking a UAV, wherein the elevated structure is co-located with a building and anchored to an exterior sidewall of the building and comprising:
      at least one support that extends between a ground adjacent to the building and the elevated structure; and
   a conveyance device configured to raise a payload from an internal loading station within the building to the elevated structure;
   wherein the elevated structure is configured to allow takeoff of a UAV therefrom.

2. The elevated UAV station of claim 1, further comprising:
   a recovery device configured to cause a controlled landing of the UAV at the elevated structure, and
   a launch device configured to cause the takeoff of the UAV from the elevated structure.

3. The elevated UAV station of claim 2, wherein:
   the launch device comprises a track and a pulley system,
   the track is adapted to receive the UAV, and
   the pulley system is configured to engage the UAV and accelerate the UAV along the track, thereby causing the takeoff of the UAV from the elevated structure.

4. The elevated UAV station of claim 2, wherein the launch device is one of a plurality of launch devices, each of the plurality of launch devices configured to cause the takeoff of the UAV from the elevated structure.

5. The elevated UAV station of claim 1, wherein the elevated structure is elevated above a ground floor of the building.

6. The elevated UAV station of claim 1, wherein:
   the conveyance device is a first conveyance device, and
   the elevated UAV station further comprises a second conveyance device arranged with the elevated structure to route the payload from the first conveyance device to the UAV.

7. The elevated UAV station of claim 1, further comprising a logistics zone arranged with the elevated structure, the logistics zone including:
   a fixed-wing storage having a plurality of fixed-wing assemblies,
   a battery storage having a plurality of battery assemblies and a corresponding plurality of docking stations, and
   a fuselage storage having a plurality of fuselages.

8. The elevated UAV station of claim 1, further comprising:
   a recovery device including a pair of arms, a wire extending between the pair of arms, and an actuator configured to manipulate the pair of arms between a first position and a second position, wherein when the pair of arms are in the second position, the wire is arranged within a flight path of the UAV, and
   the UAV includes a hook configured to engage the wire, thereby causing the controlled landing of the UAV at the elevated structure.

9. The elevated UAV station of claim 1, wherein the elevated structure is exterior to the building and fixed to a ground location adjacent the building.

10. The elevated UAV station of claim 1, wherein the conveyance device comprises:
    a tubular structure extending from the internal loading station to the elevated structure, wherein the payload is transported through the tubular structure from the internal loading station to the elevated structure.

11. The elevated UAV station of claim 1, wherein the building and the elevated structure are immobile.

12. An elevated unmanned aerial vehicle (UAV) station, comprising:
    an elevated structure configured to allow takeoff of a UAV from the elevated structure, the elevated structure co-located with a building and anchored to an exterior sidewall of the building and comprising:
       at least one support that extends between a ground adjacent to the building and the elevated structure;
    a conveyance device configured to raise a payload to the elevated structure; and
    wherein the building is adapted to store the payload at a storage elevation below an elevation of the elevated structure
    wherein the elevation of the elevated structure defines an above-grade clearance of at least 14 feet.

13. A system comprising:
    a building adapted to store a plurality of payloads at a first elevation;
    a conveyance device configured to raise a payload from an internal loading station within the building to an elevated structure; and
    an elevated unmanned aerial vehicle (UAV) station at a second elevation above the first elevation and co-located with the building, wherein:
       the elevated UAV station is anchored to an exterior sidewall of the building and adapted to receive a payload of the plurality of payloads from within the building and transport the payload to an offsite location using a UAV, and
       the elevated structure is exterior to the building and fixed to a ground location adjacent the building.

14. The system of claim 13, wherein the elevated UAV station comprises a conveyance device configured to raise the payload to an elevated structure.

15. The system of claim 14, wherein the elevated UAV station further comprises a logistics zone, the logistics zone including modular components used to assemble the UAV.

16. The system of claim 15, wherein the modular components comprises:
    a plurality of fixed-wing assemblies,
    a plurality of battery assemblies, and
    a plurality of fuselages.

17. The system of claim 16, wherein
    the system further comprises the UAV, and
    the UAV comprises an assembly of one of:
       any fixed-wing assembly of the plurality of fixed-wing assemblies,
       any battery assembly of the plurality of battery assemblies, and
       any fuselage of the plurality of fuselages.

18. The system of claim 13, wherein the elevated UAV station comprises a plurality of launch devices arranged on an elevated structure, each launch device of the plurality of launch devices being configured to cause a takeoff of the UAV from the elevated structure.

19. The elevated UAV station of claim 13, wherein the elevated structure further comprises at least one support that extends between a ground adjacent to the building and the elevated structure.

20. A method comprising:
conveying a payload to an elevated structure co-located with a building and anchored to an exterior sidewall of the building, wherein the elevated structure is exterior to the building and fixed to a ground location adjacent the building;
receiving a payload from the building by a conveyance device configured to raise the payload from an internal loading station within the building to the elevated structure;
assembling an unmanned aerial vehicle (UAV) on the elevated structure, including loading the payload;
launching the UAV to an offsite location, the UAV carrying the payload; and
recovering the UAV at the elevated structure.

21. The method of claim 20, wherein:
the assembling further comprises:
obtaining a fixed-wing assembly from a plurality of fixed-wing assemblies,
obtaining a battery assembly from a plurality of battery assemblies, and
obtaining a fuselage from a plurality of fuselages, and
each of the plurality of fixed-wing assemblies, the plurality of battery assemblies, and the plurality of fuselages are stored on the elevated structure.

22. The method of claim 20, wherein the conveying further comprises raising the payload to a first elevation of the elevated structure, the payload being stored at a storage elevation below the first elevation.

23. The method of claim 22, wherein the conveying further comprises routing the payload to the UAV at or above the first elevation.

24. The method of claim 20, wherein the recovering further comprises:
manipulating a pair of arms between a first position and a second position, the pair of arms connected with a wire extending therebetween, and
engaging the wire with a hook of the UAV, thereby causing a controlled landing of the UAV at the elevated structure.

25. An elevated unmanned aerial vehicle (UAV) station, comprising:
an elevated structure for receiving and docking a UAV, wherein the elevated structure is co-located with a building and anchored to an exterior sidewall of the building and the elevated structure is exterior to the building and fixed to a ground location adjacent the building; and
a conveyance device configured to raise a payload from an internal loading station within the building to the elevated structure;
wherein the elevated structure is configured to allow takeoff of a UAV therefrom.

26. An elevated unmanned aerial vehicle (UAV) station, comprising:
an elevated structure for receiving and docking a UAV, wherein the elevated structure is co-located with a building and anchored to an exterior sidewall of the building; and
a conveyance device configured to raise a payload from an internal loading station within the building to the elevated structure and comprising:
a tubular structure extending from the internal loading station to the elevated structure, wherein the payload is transported through the tubular structure from the internal loading station to the elevated structure;
wherein the elevated structure is configured to allow takeoff of a UAV therefrom.

* * * * *